United States Patent Office 2,746,955
Patented May 22, 1956

2,746,955
MANUFACTURE OF AZO DYESTUFFS

William H. Armento, Albany, N. Y., assignor to General Aniline & Film Corporation, New York, N. Y., a corporation of Delaware No Drawing. Application June 3, 1952,
Serial No. 291,583

6 Claims. (Cl. 260—175)

This invention relates to an improved method for the production of azo dyestuffs and is particularly concerned with an improved method for effecting the coupling reaction between a diazo compound and coupling component.

In azo dye manufacture the diazo compound (unless especially stabilized as by salt or diazoimino formation) is practically always produced, maintained and used at a low temperature. The reason for this is the instability of a great many diazos. This instability is particularly pronounced in alkaline medium. With essentially all diazos, decomposition occurs almost instantaneously in alkaline medium even at room temperature. Such decomposition, however, is markedly less at low temperatures and, hence, it is customary to produce and use diazo compounds at a low temperature, usually 0–10° C.

In view of the instability of diazo compounds, it has been almost universal practice in the azo dyestuff art to effect coupling at low temperatures of from 0–10° C., the diazo solution at about 0° C. being added to the solution of the coupling component maintained at 0–10° C. throughout the addition. While such low temperature coupling is, to a large extent, successful in minimizing the decomposition of the diazo, it introduces further difficulties. At the low temperatures ordinarily used for coupling, the azo dyestuff which is formed is frequently insoluble and may be precipitated. In addition, there is frequently a decided tendency for the reaction mixture to gelatinize which hinders mixing and interferes with the reaction since dissipation of the diazo through the mass is difficult and the coupling component becomes occluded and is not readily available for reaction.

Due to the long time required for coupling at low temperatures, there is frequently a high degree of diazo decomposition resulting in a low yield of a product having poor quality. While the gelatinization of the coupling mixture may be prevented in some cases by the use of extremely dilute solutions, this is not economically feasible in commercial operation. It has also been the practice to prevent or inhibit gelatinization by incorporating large amounts of salt in the coupling mixture. This practice, however, also is objectionable since it frequently results in the formation of an amorphous type of dyestuff which is hard to filter and which may contain such large quantities of inorganic salts as to be too weak to standardize.

It is an object of the present invention to provide an improved method for the coupling of diazo compounds with coupling components whereby the coupling can be effected sufficiently to obtain a good yield of a desired dyestuff of good purity and in good physical form while avoiding the conditions which have been heretofore encountered in low temperature couplings.

Briefly stated, the present invention resides in my discovery that if the diazo compound, while it is still in a stable condition (i. e., at a low temperature of 0–10° C. and preferably slightly acid), is added to a solution of the coupling component which is maintained, throughout the addition of the diazo thereto, at a slightly elevated temperature (i. e., 40–50° C.); that the coupling reaction occurs rapidly and is accompanied by a minimum amount of diazo decomposition. In addition, the high temperature of the coupling solution retains the resultant azo dyestuff in solution, thus permitting unrestricted agitation and frequently permitting the use of solutions of sufficient concentration that the final dyestuff may be obtained by merely drying (e. g., on a drum dryer) the final reaction mixture without the necessity of salting out and filtering the dyestuff prior to drying.

In practicing the present invention, it is necessary that the solution of the coupling component to which the diazo is added be maintained, throughout each addition, at a temperature within the range of 40–55° C.; and that the diazo compound which is at a sufficiently low temperature to be stable be added thereto at a rate no faster than that at which the diazo couples with the coupling component so that there is no free diazo present in the coupling bath. The absence of such free diazo can be readily determined by spot tests with H acid or beta-naphthol solution.

Surprisingly enough, the slightly elevated temperature employed for coupling in practicing the present invention appears to activate the coupling much more than decomposition of the diazo with the result that the quality of the resulting dyestuff and the yield thereof is improved in many cases over the best results obtainable with low temperature coupling in the prior art.

Since diazo compounds are, as stated, much more unstable in alkaline medium than they are in acid medium, it will be apparent that the greatest benefits of the present invention can be obtained in couplings which are ordinarily effected in alkaline medium. The present invention, therefore, will be described in connection with specific examples of such couplings.

The present invention is particularly valuable for the production of azo dyestuffs obtained by coupling of diazo compounds with J-acid urea. These dyestuffs may be illustrated by the following formula:

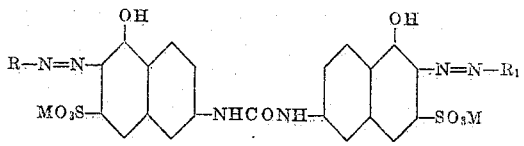

Wherein R may be a radical derived from an aminobenzene derivative such as aniline, o-anisidine, o-toluidine, anthranilic acid, p-aminoacetanilide and $R_1$ may be the same or a radical derived from an aminonaphthalenesulfonic acid such as 2-naphthylamine-6-sulfonic acid and 1-naphthylamino-4-sulfonic acid; and M is hydrogen or alkali metal.

These dyestuffs are manufactured by diazotizing an amino benzene compound and an amino aryl compound and coupling the same with J acid urea, 6,6'-ureylenedi-(1-naphthol-3-sulfonic acid), equimolar amounts of the reactants being used. Due to the high degree of instability of aniline type diazos, this coupling has heretofore been carried out at low temperatures, i. e., below 10° C. and usually within the limits of 0–10° C. in order to limit decomposition. However, in carrying out this type of coupling at such low temperatures there is a strong tendency to gelatinization of the charge and it has therefore been customary to add a large amount of salt in order to inhibit such gelatinization. On recovering the product, usually by filtration and drying, the presence of large amounts of salt results in an extremely bulky and unwieldly filter cake which was difficult to dry and which often times contains such a low percentage of dyestuffs that standardization against a standard of stated strength is impossible. In addition the coupling is relatively slow at low temperatures resulting in long occupancy times for the equipment used which constituted a substantial manufacturing cost.

I have now discovered that such dyestuffs may be produced in good yield and obtained in an improved form by producing them in accordance with the following procedure: 1 mole of an amino benzene compound is diazotized at its usual low temperature of diazotization and a second 1 mole of an aminoaryl compound (which may also be an amino benzene compound) is diazotized at its usual temperature of diazotization. The thus obtained diazos are then added with constant stirring to an alkaline solution of 1 mole of J acid urea. In accordance with the process of the present invention it is essential that the alkaline solution of J acid urea be held at a temperature of 40–55° C. during such addition and that the diazo of any amino benzene compound which is added be at a temperature of 0–10° C. when it is added. In case two different diazo compounds are employed in the coupling reaction of the present compound they may be added to the alkaline solution of J acid urea either mixed, simultaneously or sequentially and it is immaterial which of the two diazo compounds, if two are used, is added first. It will be understood that in case two diazo compounds are used one of which is not an amino benzene derivative but is for instance an amino naphthalene diazo, it need not be on addition, at a temperature of 0–10° C. but since it is not extremely unstable may be added at a slightly higher temperature so long as it is not above its own temperature of decomposition. Conveniently the diazo compounds, cooled within the temperature of 0–10° C. may be mixed and the mixture added at a temperature of 0–10° C. to the alkaline solution of J acid urea held within a temperature of 40–55° C. I have found that when the reaction is carried out in this way coupling occurs substantially instantaneously so that there is no free diazo compound present at any time after the addition takes place and hence no chance of its decomposition. Since the formation of the dyestuffs by this method is immediate the total coupling time required is the time necessary for addition of the diazo compounds to the coupler which is about 20–45 minutes. This is a distinct saving of time over the prior art processes. On completion of the addition of the diazo compounds the dyestuff is salted out. However, appreciably less salt is required to effect this salting out as compared with the prior art amounts necessary to inhibit gelatinization. On salting out, the dyestuff is obtained in a good crystalline form which filters rapidly and results in a product having only ½ to ⅓ of the bulk of the prior art press cake. The product thus obtained therefore contains a higher percentage of the dyestuff, is also dried much more easily than the prior art product. In fact it is possible to eliminate the filtration step and transfer the dyestuff directly from the coupling vat to a drum dryer for quick and easy drying. This was not possible according to the prior art cold coupling method and as indicated above the product is obtained by my process in a purer and improved physical form.

The details of the present invention will be apparent to those skilled in the art from a consideration of the following specific examples in which the parts are by weight:

Example 1

223 parts 6-naphthylamine-2-sulfonic acid are combined with 3,000 parts water and 85 parts soda ash. The temperature is adjusted to 20–25° C. 387 parts hydrochloric acid 21° Bé are added followed by addition of 69 parts sodium nitrite solution (31.5% NaNO₂). The temperature is maintained at 20–25° C. for 2 hours and then the diazo solution is iced to 10° C. for addition to the J acid urea.

1300 parts water, 384 parts hydrochloric acid 21° Bé and 93 parts aniline are combined and cooled to 0° C. 69 parts sodium nitrite solution (31.5% NaNO₂) are added and the solution maintained at 0° C. for 30 minutes. This diazo solution is then combined with the cold diazo solution from 6-naphthylamino-2-sulfonic acid the combined diazo mixture being kept at 0° C.

504 parts J acid urea and 8,000 parts water are mixed well with 75 parts of a 30% caustic soda solution. 400 parts soda ash are added. The temperature is maintained at 40–45° C. for 20–30 minutes during which time the above prepared diazo mixture (at 0° C.) is added. After the completion of the addition, the mix is stirred well for about 15 minutes, heated to 75° C. salted with about 4200 parts salt, filtered and dried. A good product of a high degree of purity and of an average strength of $^{65}\!/_{100}$ is obtained by this process.

Example 2

5200 parts water are cooled to 0° C. with about 2400 parts ice. 150 parts p-aminoacetanilide are added and mixed well. 92.8 parts hydrochloric acid 21° Bé are added followed by addition of 93 parts aniline. 138 parts sodium nitrite (31.5% NaNO₂) are added immediately and the charge is stirred for 45 minutes. The mixed diazos are then added to a thorough mixture of 8,000 parts water, 504 parts J acid urea and 600 parts soda ash which mixture is at a temperature of 50–55° C. After the diazo has been added, the charge is blown to a drum dryer where it is dried rapidly and economically. The product has good crystal properties, a high degree of purity, is of a good strength and is obtained in high yield.

It will be understood that the above examples are illustrative only of the present invention and that, by selection of the particular amino benzene compound and the particular amino aryl compound whose diazonium salt is employed in the coupling reaction with J acid urea, a wide variety of dyestuffs of the type included in the formula given above may be produced since the present invention is concerned with an improvement in the process for manufacturing of these dyestuffs rather than with any novel dyestuffs per se. The essential characterizing improvement of the process of the present invention for manufacturing dyestuffs of the formula given above, in which 2 moles of diazotized amino aryl compound (at least 1 mole of which is derived from amino benzene compound) are coupled with J acid urea, is the addition of the diazotized amino benzene compound at the temperature within the range of 0–10° C. to an alkaline solution of J acid urea maintained at a temperature of 40–55° C. As examples of amino benzene compounds which may be employed in the present reaction may be mentioned, in addition to aniline and p-aminoacetanilide which were employed in the specific examples, such amino benzene compounds as o-, m-, or p-anisidine, o-, m-, or p-toluidine, anthranilic acid, metanilic acid, sufanilic acid, 2,5-dimethoxyaniline, m-, and p-nitroaniline, 2 - chloro - 4-nitroaniline, 2-chloro-p-toluidine and the like. It has been found that the process of the present invention is particularly valuable for the production of dyestuffs of the formula given above in which the group R₁ is a sulfonaphthalene group derived from a monoamino-naphthalene monosulfonic acid and therefore in a preferred embodiment the present invention contemplates the use of the diazo of such amino sulfonaphthalene compounds such as 6-naphthylamine-2-sulfonic acid disclosed in Example 1 above or 1-naphthaleneamine-4-sulfonic acid and the like as the aryl amino compound specified.

While the process of the present invention was first developed in connection with the manufacture of J acid urea azo dyestuffs and is particularly valuable in connection therewith, I have found that the process is generally applicable to the manufacture of azo dyestuffs and is particularly valuable and greatest improvement is obtained by its use in the production of dyestuffs in which a diazo compound which is relatively unstable is coupled with a coupling component in alkaline medium. The benzene diazos, for example, as a class, are quite unstable and must be maintained at temperatures below about 10° C. in order to prevent decomposition and, also, as a safety measure. I have found that the process of the present invention is applicable and improved results are obtained in the manufacture of azo dyestuffs by coupling benzene diazos with a wide variety of coupling components.

The following specific examples illustrate the details of the present invention as applied to the production of a number of azo dyestuffs.

*Example 3*

39.8 parts anthranilic acid are diazotized in usual manner at about 10° C. The diazo is then added over a period of about twenty minutes to a solution of 75.4 parts 4-sulfophenyl methyl pyrazolone in 450 parts water and 40 parts soda ash, maintained at a temperature of 50–55° C. The temperature is maintained at 50–55° C. for about ½ hr., as also the charge is maintained alkaline to Brilliant Yellow. The dyestuff is then precipitated by addition of salt (10% by volume), filtered and dried. The probable formula of the resultant azo dyestuff is:

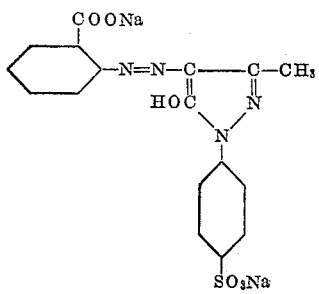

*Example 4*

53.7 parts o-anisidine are diazotized in the usual manner at 0–10° C. The diazo is then run into a solution (over a period of about 20 minutes) of 150 parts acetyl-H-acid dissolved in 500 parts water and 82 parts soda ash at a temperature of 45–50° C. After stirring for about 1 hour, in which the 45–50° C. temperature and Brilliant Yellow alkalinity are maintained, the slurry is drum dried. The dyestuff has the probable formula:

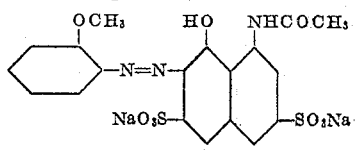

*Example 5*

76 parts sulfanilic acid are diazotized in usual manner at a temperature below 10° C. The diazo is then added (over a period of about 20 minutes) to a solution containing 66 parts 2-naphthol dissolved in 250 parts water, 18.6 parts caustic soda and 30 parts soda ash, maintained at a temperature of 45–50° C. After stirring for about ½ hr., the slurry is drum dried. The probable formula is:

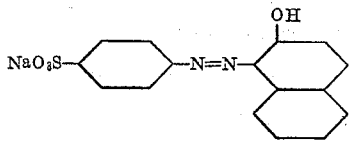

*Example 6*

40 parts p-nitroaniline are diazotized in the usual manner at 0° C. The diazo is then added over a period of about ½ hour to a solution of 43.5 parts salicylic acid dissolved in 200 parts water and 105 parts soda ash, maintained at 45–50° C. After stirring for about ½ hour, while maintaining alkaline to Brilliant Yellow and at 45–50° C., the slurry is drum dried. The probable formula is:

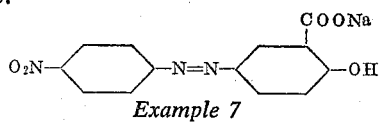

*Example 7*

39 parts sulfanilic acid are diazotized in the usual manner at a temperature of below 10° C. The diazo is then added over a period of about twenty minutes to a solution of 76.5 parts 2,5-dichloro-4-sulfophenyl methyl pyrazolone dissolved in 350 parts water and 62 parts soda ash, at 40–45° C. After stirring for one hour, while maintaining Brilliant Yellow alkalinity and at a temperature of 40–45° C., the slurry is drum dried. The probable formula is:

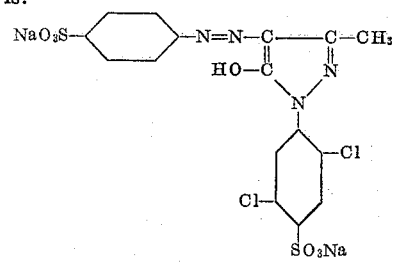

While the greatest advantages of the present invention are obtained when it is employed in conjunction with the coupling of diazo compounds which are unstable at temperatures above 10° C., it has also been found that the principles of the present invention may be employed with advantage in the manufacture of azo dyestuffs involving the coupling of diazo compounds which are stable at slightly higher temperatures.

In acid medium, diazos are much more stable than in alkaline but even here individual diazo compounds differ slightly as to their degree of stability in acid. Most of the benzene diazos, for example, are extremely unstable and, as previously stated, must be maintained at temperatures below about 10° C. to insure best results as well as safety. Thus far, the present invention has been limited to this class of diazo compounds. There are, however, quite a number of diazos which are quite stable in acid media at higher temperatures, even up to 20–30° C. To this group belong o-hydroxy benzene diazos (which are believed to be more stable due to the formation of a ring compound), certain naphthalene-diazos, particularly those which contain sulfonic acid substituents which are capable of forming a ring compound, benzidine tetrazos and others.

While this latter class of diazo compounds could be cooled below 10° C. and coupled in the same manner as the benzene diazos employed in the foregoing examples, this precaution is not necessary since they are stable in acid up to temperatures of about 20–30° C. When such relatively stable diazos are employed, they need only be maintained under conditions (acid media and about room temperature) at which they are stable and may be added at this condition to a bath of coupling component maintained at a temperature of 40–55° C. (i. e., a temperature such that the coupling reaction is activated to a greater extent than the decomposition of the diazo) so that on addition of the diazo component, coupling occurs before decomposition of the diazo, the diazo being added at such a rate that there is at no time any free diazo in the coupling mixture, as evidenced by spot tests.

The following examples illustrate the preferred manner of applying the present invention to the coupling of such relatively stable diazo compounds.

*Example 8*

54 parts o,o'-tolidinedisulfonic acid are tetrazotized in usual manner at 10–20° C. The tetrazo is added over a period of about twenty minutes to a solution of 43 parts 2-naphthol in 200 parts water and 19 parts caustic soda, maintained at 45–50° C. and maintained alkaline, after which the slurry is drum dried. The dyestuff has the probable formula:

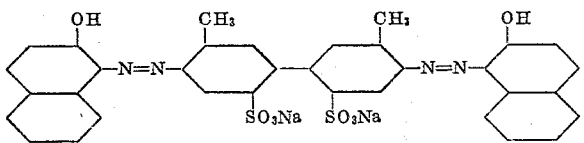

*Example 9*

53.3 parts benzidine are tetrazotized in the usual manner at 5–15° C. The tetrazo is then added over a period of about twenty minutes to a solution of 200 parts H-acid dissolved in 600 parts water and 160 parts soda ash, maintained at 45–55° C. After stirring for one-half hour, during which time the charge is maintained alkaline to Brilliant Yellow and at a temperature of 45–55° C., the dye solution is drum dried. The probable formula is:

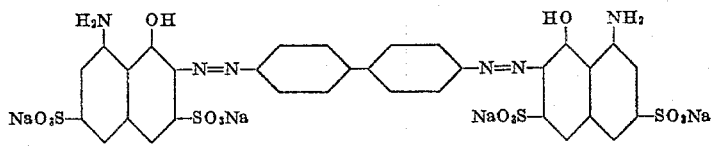

*Example 10*

70.8 parts dianisidine are tetrazotized in the usual manner at 10–20° C. The tetrazo is then added over a period of about one-half hour to a solution of 69 parts 1-naphthol-4-sulfonic acid and 69 parts 1-naphthol-5-sulfonic acid in 250 parts water and 84 parts soda ash, maintained at 45–55° C. After stirring forty-five minutes, while maintaining alkaline to Brilliant Yellow and at 45–55° C., the slurry is drum dried. The probable formula is:

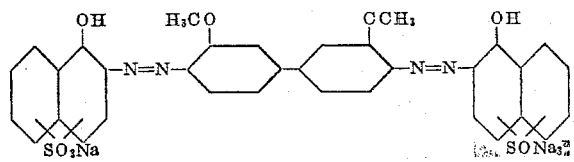

*Example 11*

26.8 parts o,o-tolidine disulfonic acid are tetrazotized in the usual manner at 10–20° C. The tetrazo is then added slowly to a solution of 28 parts acetoacetanilide dissolved in 300 parts water and 40 parts sodium bicarbonate maintained at 45–50° C. After stirring one hour while maintaining slightly alkaline to Brilliant Yellow and at a temperature of 45–55° C., the slurry is drum dried. The probable formula is:

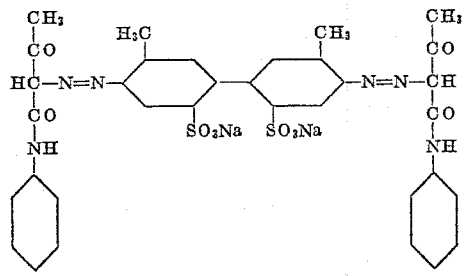

This application is a continuation-in-part of my copending application (now abandoned) Serial No. 124,477, filed October 29, 1949.

I claim:

1. In the process of manufacturing azo dyestuffs, wherein a diazo compound, which is unstable at temperatures above 30° C. is coupled under alkaline conditions with a coupling component; the improvement, which comprises adding said diazo compound, at a temperature below 30° C. and at which it is stable, to an alkaline solution of the coupling component maintained at alkaline conditions, and at a temperature within the range of 40 to 55° C. during such addition.

2. In the process of manufacturing azo dyestuffs, wherein the diazonium salt of an amino benzene compound, which is unstable at temperatures above about 10° C., is coupled under alkaline conditions with a coupling component, the improvement, which comprises adding said diazonium salt of said amino benzene compound, at a temperature below 10° C. and at which it is stable, to an alkaline solution of said coupling component maintained alkaline, and at a temperature within the range of 40 to 55° C. during such addition.

3. In the process of manufacturing dyestuffs of the formula

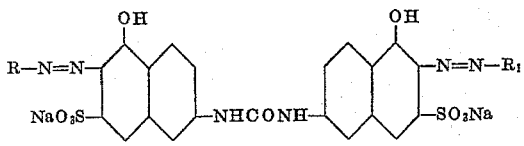

wherein R represents the aromatic residue of an amino benzene compound and R₁ represents the aromatic residue of an amino aryl compound by coupling in an alkaline medium a diazonium salt of an amino benzene compound and a diazonium salt of an amino aryl compound with J acid urea, the improvement which comprises adding said diazonium salts of said amino benzene and amino aryl compounds at a temperature of from 0–10° C. to an alkaline solution of J acid urea maintained alkaline and at a temperature within the range of 40–55° C. during such addition.

4. The process as defined in claim 3, wherein the amino aryl compound specified is a naphthylamine sulfonic acid.

5. The process as defined in claim 3 wherein the amino benzene compound specified is aniline and the amino aryl compound specified is 6-naphthylamine-2-sulfonic acid.

6. The process as defined in claim 3 wherein the amino benzene compound specified is aniline and the amino aryl compound is p-amino acetanilide.

References Cited in the file of this patent

UNITED STATES PATENTS

| 1,087,429 | Blank et al. | Feb. 17, 1914 |
| 1,265,031 | Anderwert et al. | May 7, 1918 |
| 2,428,130 | Straub et al. | Sept. 30, 1947 |
| 2,573,851 | Lacey et al. | Nov. 6, 1951 |

FOREIGN PATENTS

| 11,766 | Great Britain | 1901 |

OTHER REFERENCES

Groggins: "Unit Processes in Organic Synthesis" 1947, page 160.